United States Patent [19]

Outhwaite et al.

[11] 4,119,846
[45] Oct. 10, 1978

[54] NON-CONTACTING GAGE APPARATUS AND METHOD

[75] Inventors: Stephen Outhwaite, Clarks Summit, Pa.; James C. Majure, Huntsville, Ala.

[73] Assignee: Sangamo Weston, Inc., Archbald, Pa.

[21] Appl. No.: 765,180

[22] Filed: Feb. 3, 1977

[51] Int. Cl.$^2$ .................. G01D 18/00; G21K 7/00; G01N 23/00

[52] U.S. Cl. .................... 250/252; 250/308; 250/358 R

[58] Field of Search .............. 250/252, 358 R, 308; 364/481, 563

[56] References Cited

U.S. PATENT DOCUMENTS 3,524,063  8/1970  Mangan .................. 250/252 X
3,611,408  10/1971 Shoemaker ............... 250/252 X
4,009,376  2/1977  Faraguet ................. 250/252 X Primary Examiner—Alfred E. Smith
Assistant Examiner—Janice A. Howell
Attorney, Agent, or Firm—William R. Sherman; Martin Novack

[57] ABSTRACT

The disclosure is directed to a non-contacting gage apparatus and method of the type wherein radiation attenuation is measured to obtain thickness information. A first function is developed and is representative of the thickness of standard pieces versus measurement values. A second function is developed and is representative of the Absorption Index of alloy material (to be measured) versus thickness. Calibration can then be effected using the two functions and the nominal thickness of material to be measured.

12 Claims, 8 Drawing Figures

NON-CONTACTING GAGE APPARATUS AND METHOD

BACKGROUND OF THE INVENTION

This invention relates to gaging apparatus for determining deviations of a material property and, more particularly, to an improved gaging apparatus and method of the non-contacting type wherein a beam of radiation is passed through the material to be measured and then detected to determine properties of the material.

Thickness measuring gages of the non-contacting type are conventionally used to determine deviations in thickness of certain materials, for example metals such as steel or aluminum processed at rolling mills. The gage typically includes a source of penetrative radiation, such as X-rays, which directs radiation toward a detector spaced from the source. The space between the source and the detector is defined as an inspection field and the material to be gaged, usually a strip or sheet of metal, is disposed in the inspection field and causes a degree of attenuation of the radiation. Variations in the attenuation caused by the material being measured are indicative of variations in the thickness of the material. However, a number of complicating factors exist, since the measured attenuation is also a function, inter alia, of the material's composition and the intensity and wavelength of the radiation. Since the effect of these various factors upon the measurements are not generally linear, most system designs strive to keep as many factors as possible within known ranges to minimize errors.

Available radiation gages often cover an overall range of measurement divided into multiple subranges. Each interval is generally determined by presetting the level of either the radiation source or the detector, or both. So-called "standard" pieces of metal to be measured are temporarily positioned in the inspection field. The standards are of precisely known thickness and can accordingly be used to calibrate the gage for measurement of a material expected to have approximately the same thickness as the standard. In some equipments, means are provided for inserting a number of different standards of different known thickness into the inspection field, this being done with a subsystem known as an automatic standards magazine. In one type of operation, the standards are only utilized beforehand during a calibration procedure, such as to determine the null setting of a detector meter or to calibrate full scale deflections on the meter. In such case, standards are not present in the inspection field during the measurement phase of operation. In another type of operation, known as a "complementary" technique, standards of known thickness are inserted in the inspection field of conjunction with the material being measured such that the thickness of the standards plus the material being measured yields an attenuation that is expected to substantially equal one of a number of precalibrated points within the total range of the gage.

Existing systems are found to suffer one or more operational disadvantages. The number of available standards is limited and the expected thickness of the material to be measured (i.e., the "nominal" thickness) does not necessarily correspond to the thickness of an available standard. Interpolation is possible, but is further complicated by the fact that drifts in the radiation source or detector over relatively short periods of time can cause inaccuracies. Also, variations in the measured attenuation are generally not linear. Accordingly, a certain degree of guesswork, or simplifying assumptions, are often introduced during calibration or recalibration. A further factor, not yet discussed, is that the material to be measured may likely be an alloy having a composition which is different than the available full set of standards, and it is typically impractical to obtain a full range of sample thicknesses for each alloy that might be encountered. Since absorption of radiation varies substantially with the material's composition, it is necessary to correct for this variation in calibrating the gage. To illustrate a typical prior art technique, assume that the available standards are formed of a "pure" metal and the material to be measured is an alloy of that metal which exhibits a generally greater degree of absorption of radiation than the pure metal. The term Absorption Index ("AI") is defined as follows:

$$AI\,(in\%) = \left(\frac{\text{apparent thickness}}{\text{nominal thickness}} - 1\right) \times 100$$

where the apparent thickness is the thickness of a pure metal standard which would result in the same detector measurement as alloy material having the nominal thickness. In this example, the AI is positive since the apparent thickness of a pure metal standard is greater than that of the nominal thickness of alloy. (In other words, since the alloy is more absorbing of radiation, a greater thickness of pure metal would be need to obtain the same degree of attenution.) In the prior art, the absorption index for a particular alloy to be measured is typically determined by temporarily positioning a sample of the alloy, of known thickness, in the inspection field and determining the AI for the alloy by comparing the measurement with the measurement taken on a pure metal standard of the same thickness. The determined AI might then be used in calibrating the gage. Unfortunately, the absorption index is not constant, but varies, inter alia, with the thickness of the materials being compared. Accordingly, if the nominal thickness of the alloy to be measured is different than the thickness of available alloy samples, the determined AI may be inaccurate and introduce error. Alloy samples of many different thicknesses may not be conveniently available, and a problem exists in accurately gaging thicknesses of alloy materials to be measured, especially when the exact absorption characteristics of the alloy are not known beforehand.

It is one object of the present invention to provide solution to the prior art problems as set forth and to devise a novel gaging apparatus and method which can be accurately and conveniently calibrated and subsequently determines material thicknesses automatically and without guesswork.

SUMMARY OF THE INVENTION

The present invention is directed to an apparatus and method for gaging the thickness of a material, typically an alloy of which a limited number of samples of known thickness are available. An important aspect of the invention is the calibration of the gaging apparatus which is performed before the material measurement phase of operation. A source of radiation is provided and a detector means is spaced from the source of radiation, the space between the source and the detector defining an inspection field which is adapted to receive the material. Means are provided for generating measurement values as a function of the radiation attenuation caused by objects in the inspection field. The measurement values may be generated by a meter or, more typically, are obtained by noting source or detector supply voltage settings needed to produce a prescribed value at the output of the detector. Means are provided for storing a first set of measurement values associated with standard pieces of known thickness temporarily positioned in the inspection field. Generally, the standard pieces will be contained in a standards magazine and may typically be formed of the substantially "pure" metal which is the basic metal in the alloy material to be measured. However, the invention is not limited to any particular composition of standards. Means responsive to the first set of measurement values are provided for storing a first function which represents the relationship between the thickness of the standard pieces and the measurement values determined therefrom. For example, the first function may be in the form of stored coefficients which represent an equation relating a detector supply voltage setting to the thickness of the standards. Means are also provided for storing a second set of measurement values associated with material samples of known thickness temporarily positioned in the inspection field. The material samples have the same composition as the material to be measured. Means responsive to the second set of measurement values are provided for storing a second function which represents the relationship between the relative attenuation attributable to the standard pieces and the relative attenuation attributable to the material samples for different thicknesses thereof. For example, in an embodiment of the invention, the second function is represented by the coefficients of an equation which relates absorption index to thickness. Means are also provided for storing an operator-entered nominal thickness for the material to be measured. Further means are provided for determining the expected measured value which would be obtained upon insertion of material of the nominal thickness in the inspection field, the expected measured value being computed from the operator-entered nominal thickness in conjunction with the first function and the second function. The source and/or detector is then adjusted in accordance with the determined expected measured value.

In the preferred embodiment of the invention, the means for determining the expected measured value includes means for determining an apparent thickness from the operator-entered nominal thickness and the second function. The determined apparent thickness and the first function are then utilized to determine the expected measured value.

During the calibration phase of operation, discussed so far, the first and second sets of measurement values are preferably generated by adjusting the source and/or detector supply level until a predetermined detector output is obtained. After calibration has been achieved, subsequent measurements of material thickness are determined by deviations of the detector output with the source and/or detector supply remaining as set during calibration. In order to equate deviations of detector output with deviations of material thickness during the material measurement phase, an additional set of measurements is made during the previously described calibration phase of operation. In particular, the additional set of measurement values are generated, one for each standard piece, by inserting the standard pieces in the inspection field in conjunction with an additional percentage thickness for each standard piece and then measuring the resultant detector output. The first set of measurements and the additional set of measurements can then be utilized in conjunction with the apparent thickness determined from the operator-entered nominal thickness, to obtain an absorption coefficient (not to be confused with absorption index) which is used to relate deviations of the detector output to deviations of the measured material thickness.

Further features and advantages of the invention will become more readily apparent from the following detailed description when taken in conjunction with the accompanying drawings.

DESCRIPTION OF THE PREFERRED EMBODIMENT

Figure 1:
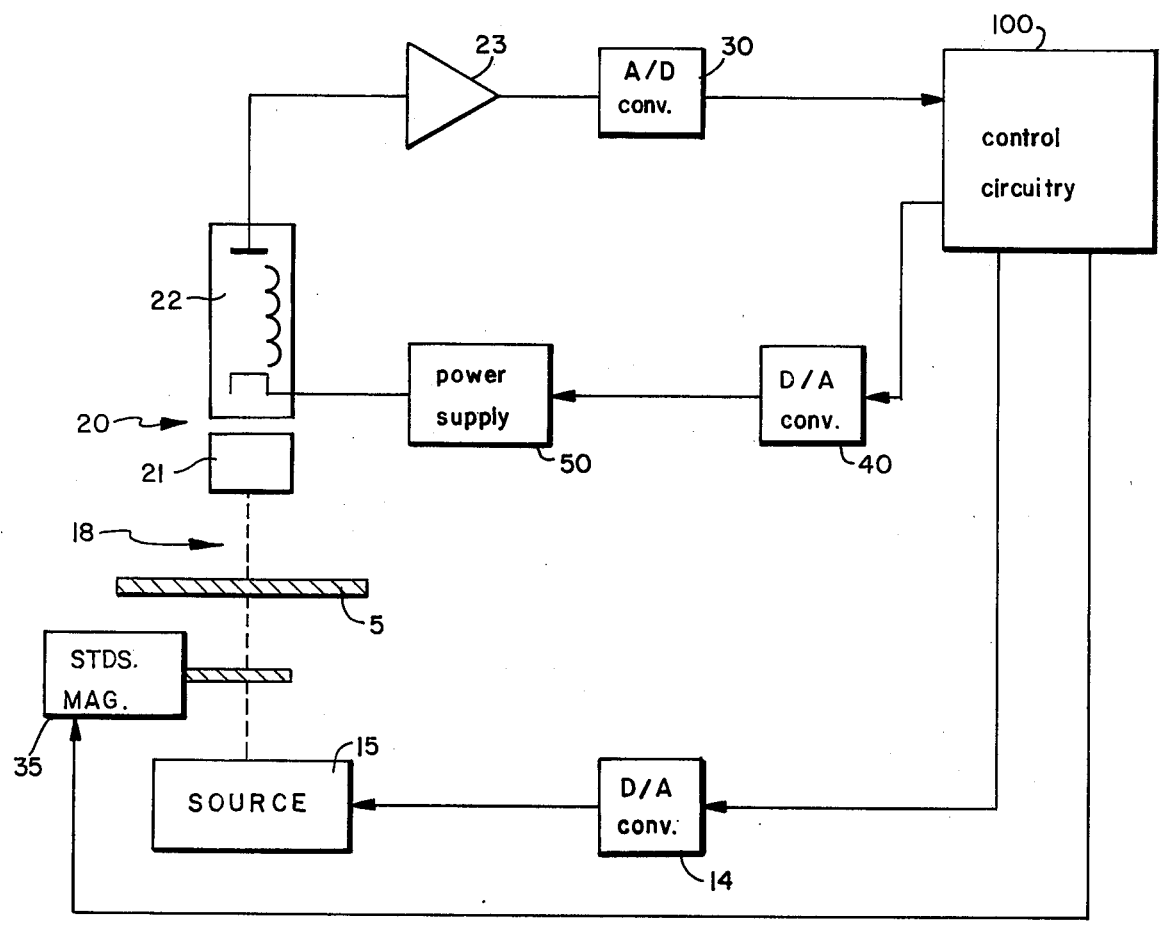
FIG. 1 is a block diagram of an apparatus in accordance with an embodiment of the invention.

Referring to FIG. 1, there is shown a block diagram of an apparatus in accordance with an embodiment of the invention. A source 15 of radiation, for example a DC-energized X-ray generator or a radioactive isotope, is spaced from a detector means 20. In the present embodiment the detector means 20 includes a scintillator 21 which converts incident X-radiation into visible light photons, and a photomultiplier tube 22 which detects the visible light and converts it into an electrical current. Current from the photomultiplier tube 22 is converted into a voltage by an amplifier 23. The voltage is coupled, via analog-to-digital converter 30 to control circuitry 100. As will be described hereinbelow, the functions of control circuitry 100 are preferably implemented using a general purpose digital computer, such as a Digital Equipment Corp. model LSI-11. It will be understood, however, that the functions of control circuitry 100 could alternately be implemented, for example, using a special purpose computer, microprocessors, or hard wired circuitry having logic and memory capabilities.

The space between the source 15 and the detector means 20 is defined as an inspection field 18 which is adapted to receive, inter alia, the material to be measured, which is designated by the reference numeral 5. An object present in the inspection field 18 attenuates the X-ray beam. Measurement values are generated as a function of the radiation attenuation caused by objects (i.e. the material 5 to be measured, or other objects to be described) in the inspection field. This can be done in various ways. During the calibration phase of the present embodiment, the photomultiplier supply voltage, which is controlled by circuitry 100 via digital-to-analog converter 40 and voltage programmable power supply 50, is adjusted until the output voltage of amplifier 23 reaches a specified value, designated as $V_z$ volts. Another D/A converter 14 can, if desired, be employed to adjust the radiation source 15.

A standards magazine 35 is located in the region of the inspection field and includes a number of metal standard pieces of precisely known thickness. Only preselected ones of the standards are inserted into the inspection field by energizing standards-driving solenoids, as is well known in the art, this being performed automatically under control of circuitry 100. In the present embodiment, a relatively large plurality of metal standard pieces are provided and are formed, for example, of a substantially "pure" metal which forms the base metal of alloys to be measured. Also available are a plurality of material samples of precisely known thickness, the material samples being of the same composition as the material 5 to be measured. For purposes of illustration it is assumed that the material 5 to be measured is an alloy and that the plurality of material samples are known thickness is a smaller plurality than the plurality of standard pieces of "pure" base metal, a full complement of which are typically available. It will be understood, however, that the invention set forth is not limited to any particular type of standard pieces or material samples, the described situation being considered only as typical and selected to facilitate description of the invention.

Figure 2:
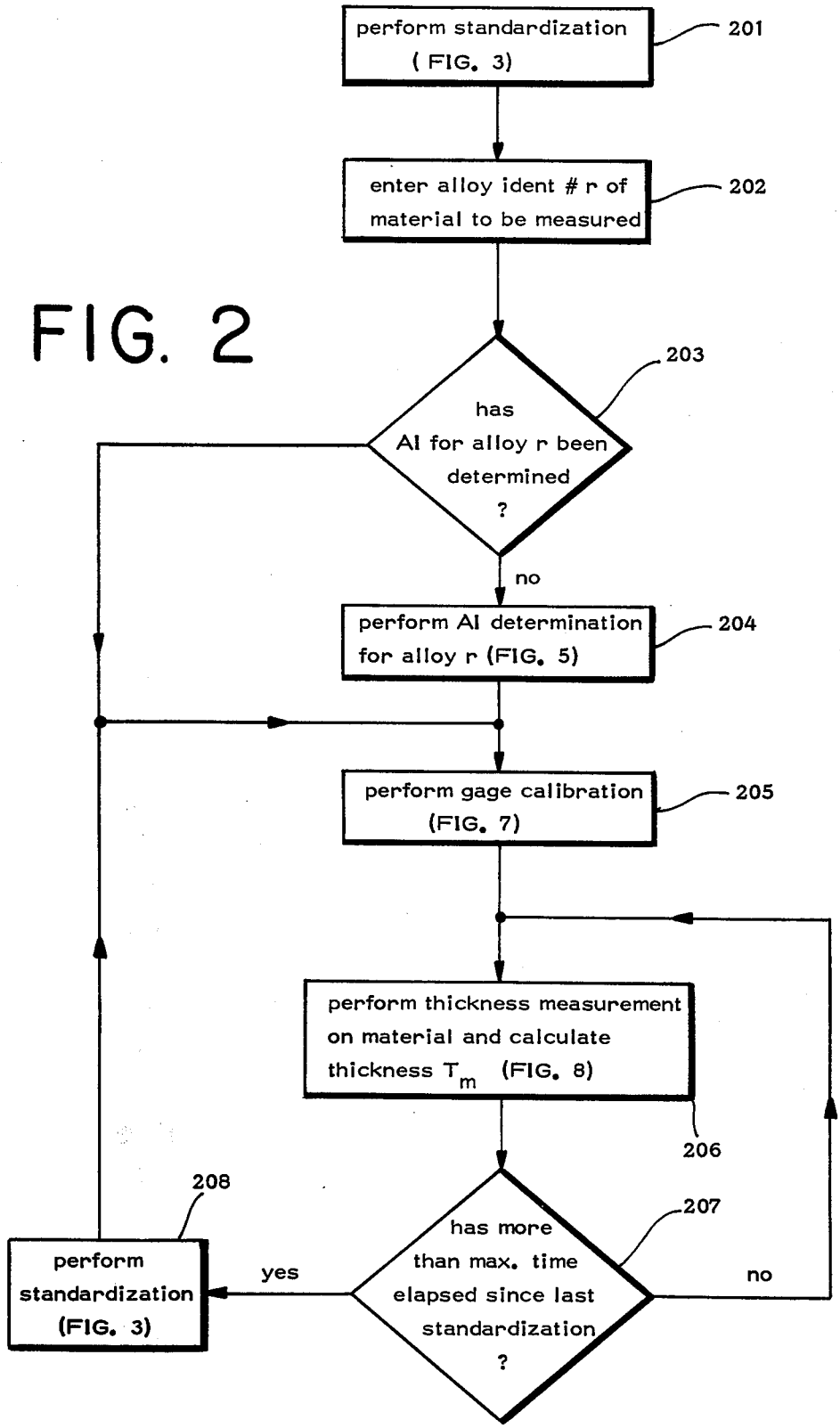
FIG. 2 is a flow diagram which, when taken in conjunction with the flow diagrams which depend therefrom, is suitable for implementing a general purpose digital computer to perform the functions of control circuitry 100 of FIG. 1.

Referring to FIG. 2, there is shown a flow diagram which, when taken in conjunction with the diagrams depending therefrom, is suitable for implementing the general purpose digital computer to perform the functions of control circuitry 100 in accordance with the present embodiment of the invention. Initially, a standardization is performed, as represented by the block 201. During the standardization routine, which is further described in conjunction with FIGS. 3 and 4, a relatively large plurality of standard pieces (of substantially "pure" metal in the present illustrative example) of precisely known thickness are positioned in the inspection field by operation of the standards magazine 35. A voltage measurement is obtained and stored for each thickness, and a first function is derived which generally relates measured voltage to thickness of the "pure" metal standard material. It is recognized that this function may vary during the life of the gage due, for example, to environmental effects upon the source and/or detector, changes in the operating characteristics of these elements or the circuitry in general, etc. Accordingly, as will be described, provision is made for periodically performing a new standardization to account for such variations. The alloy identification number of the material to be measured, designated as $r$, is next entered by the operator, as represented by the block 202. It is convenient to assign a different number to each alloy so that information about the particular alloy material can be stored in conjunction with the particular alloy's indentification number. The decision diamond 203 is next entered and inquiry is made as to whether the absorption index for the alloy $r$ has yet been determined. If the alloy sheet material had been measured on the equipment in the past, then an established absorption function for the particular alloy may already exist in memory, whereupon block 205 is directly entered. If not, however, the block 204 is entered, this block representing performance of the AI determination for the particular alloy $r$, which is described in detail in conjunction with FIGS. 5 and 6. Briefly, material samples of known thickness of the alloy to be measured are temporarily positioned in the inspection field. Measurement voltage values are determined and stored for each available sample thickness. Since any particular measurement value can now be related to a thickness of "pure" metal standard material, newly stored measurement voltages can be used, in conjunction with the previously derived first function, to derive and store a second function, also referred to as an absorption index function. This absorption index function represents the relationship between the measurements attributable to the standard "pure" metal pieces and the measurement values attributable to the alloy material samples for different thicknesses thereof. Another way of stating this is that the absorption index function represents the relationship between the relative attenuation attributable to the standard pieces and the relative attenuation attributable to the material samples for different thicknesses thereof.

Figure 7:
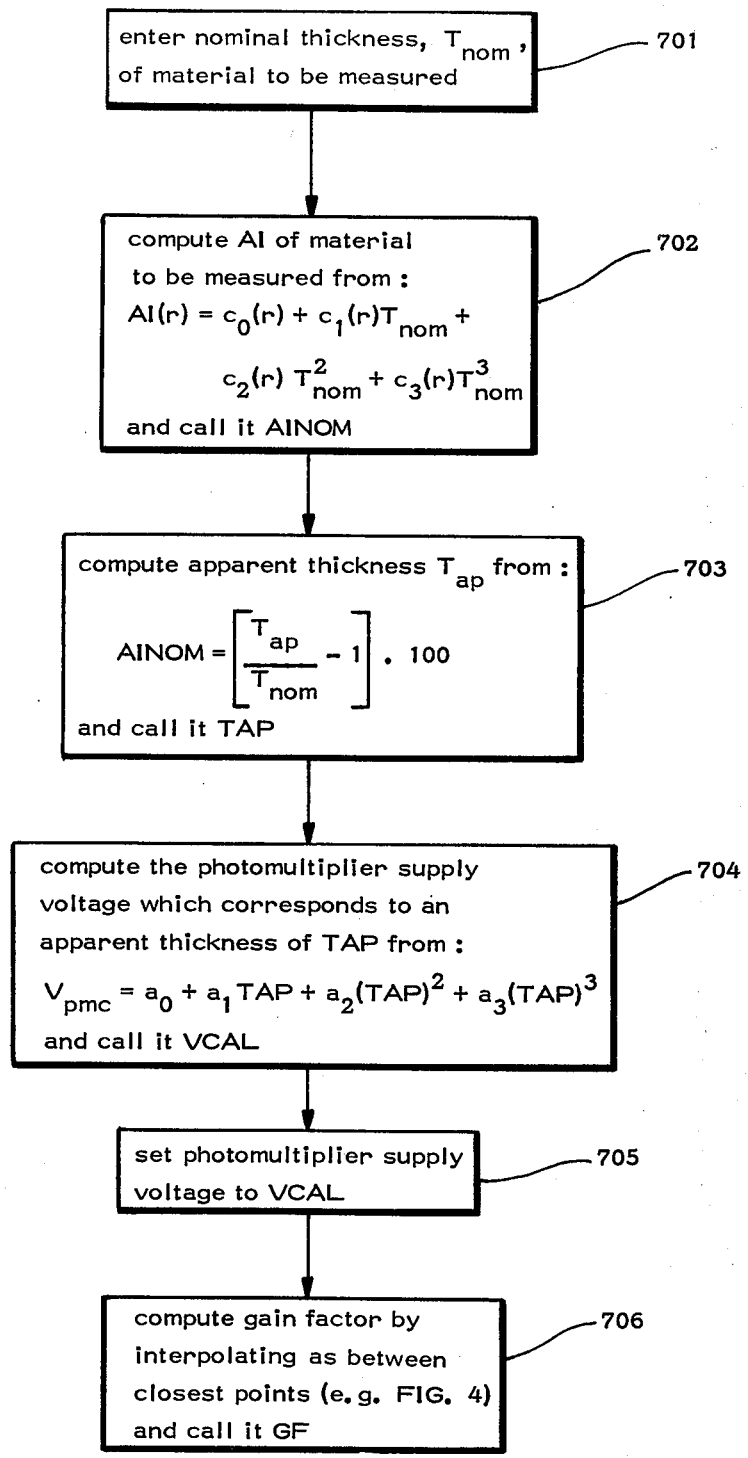
FIG. 7 is a flow diagram for implementing the functions of the block 205 of FIG. 2.

Having determined the AI function for the particular alloy $r$, the block 205 is entered, this block representing the performance of a gage calibration routine which is described in detail in conjunction with FIG. 7. Briefly, calibration is performed by entering the nominal thickness of the alloy to be measured, designated $T_{nom}$, and then computing the photomultiplier supply voltage which yields the reference amplifier voltage $V_z$, this calculation being performed using the first and second stored functions. With the gage calibrated, a thickness measurement can be performed on the alloy to be measured, and the thickness of the alloy material, designated $T_m$, is calculated and read out or recorded, this function being represented by the block 206 and described in further detail in conjunction with FIG. 8. After each thickness measurement, inquiry is instantaneously made as to whether more than the maximum specified time has elapsed since the last standardization, as represented by the diamond 207. If not, the block 206 is reentered for continuation of material measurments. If so, however, the block 208 is entered, and a new standardization (FIG. 3) is performed. The block 205 is next reentered to adjust the gage calibration and thickness measurements and then continue in accordance with the block 206.

Figure 3:
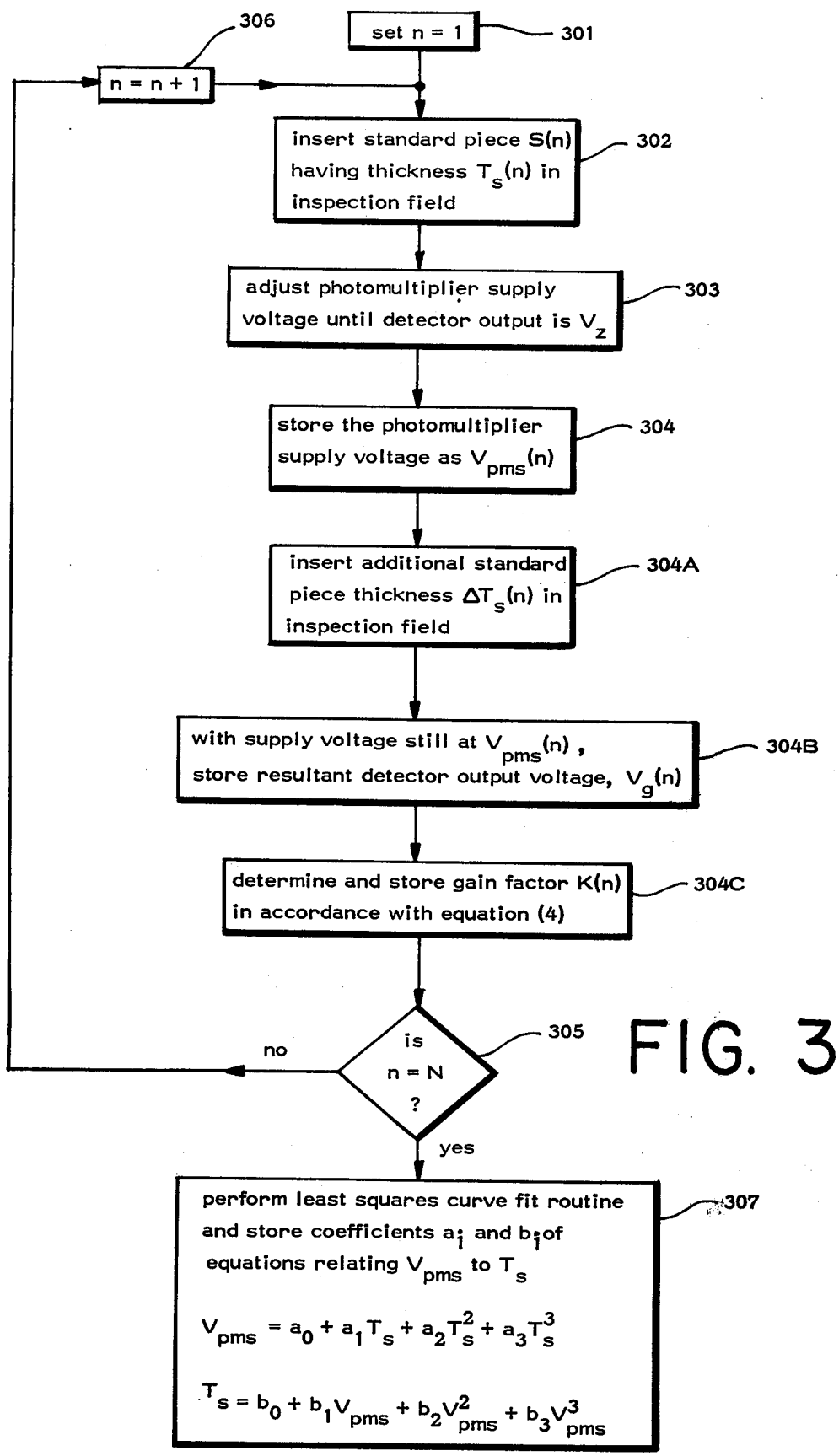
FIG. 3 is a flow diagram for implementing the functions represented by the block 201 of FIG. 2.

Referring to FIG. 3, there is shown a flow diagram suitable for implementing the standardization routine represented by the block 201 of FIG. 2. An index $n$ is initially set to unity, as represented by the block 301. The standards magazine 35 is then commanded to insert standard piece number $S(n)$, which has a thickness designated $T_s(n)$, into the inspection field, this function being represented by the block 302. As previously indicated, the thicknesses $T_s(n)$ of each standard piece $S(n)$ are precisely known beforehand and are typically previously stored in the computer 100. With the first standard piece (which, it will be recalled, is composed of "pure" metal in the present example, as are all the standard pieces) in the inspection field, the photomultiplier supply voltage is adjusted until the output amplifier voltage is equal to the reference voltage $V_z$, as represented by the block 303. The photomultiplier supply voltage, i.e. the measurement associated with the particular standard, is stored as $V_{pms}(n)$, as represented by the block 304 of FIG. 3.

In the present embodiment, and for purposes which will become clear, an additional thickness of standard material, designated $\Delta T_s(n)$ is next inserted in the inspection field (block 304A). The additional thickness may be, for example, 8% of the thickness $T_s(n)$ so that the new total thickness inserted by the standards magazine is $T_s(n) + (0.08) T_s(n)$. With the photomultiplier supply voltage kept at $V_{pms}(n)$, the resultant output amplifier voltage, designated $V_{pms}(n)$ is stored, as represented by the block 304B. The output amplifier voltages $V_z$ and $V_g(n)$, associated with the thicknesses $T_s(n)$ and $T_s(n) + \Delta T_s(n)$, respectively, are utilized to compute a "gain factor" designated $K(n)$. The gain factor can be understood by considering the well known expression for penetrating radiation passing through a material:

$$I = I_o e^{-\mu t} \tag{1}$$

where $I_o$ is the intensity of the incident radiation, I is the intensity of the non-absorbed radiation which penetrates the material, $\mu$ is the absorption coefficient (not to be confused with Absorption Index) of the material, and t is the thickness of the material. The absorption coefficient $\mu$ varies with wavelength and also varies with thickness. The two above-described measurements can be expressed in the form of equation (1) as:

$$V_z = I_o e^{-\mu T_s(n)} \tag{2}$$

and $$V_g(n) = I_o e^{-\mu [T_s(n) + \Delta T_s(n)]} \tag{3}$$

Dividing equation (3) by equation (2) and solving for $(1/\mu)$, which is defined as $K(n)$, yields:

$$K(n) = \frac{1}{\mu} = \frac{-\Delta T_s(n)}{\ln[V_g(n)/V_z]} \tag{4}$$

The gain factor, $K(n)$, is thus a measured indication of the expected variation of output voltage with material thickness, for thicknesses in the range of the particular thickness $T_s(n)$ and for the photomultiplier voltage setting $V_{pms}(n)$. Block 304C represents the determination and storage of $K(n)$ in accordance with (4). As will be understood hereinbelow, consideration of gain factors will come into play later when the measurement phase of operation is described.

With continuing reference to FIG. 3, index n is next tested, as represented by diamond 305, to determine if all the standards have been measured, the highest index number being designated as N. If not, the index n is incremented, as represented by block 306, and the block 302 is reentered. In this manner, a measurement value, $V_{pms}(n)$, and a gain factor $K(n)$, are determined and stored for each standard piece. The measurement values, as a function of standard piece thickness, are illustrated by the "x"'s in FIG. 4. The block 307 is then entered, this block representing the calculation and storage of a first function which, in the present embodiment, is a socalled "least squares curve fit" for the points shown in FIG. 4. In particular, the stored function may be represented by a plurality of coefficients, the number of coefficients depending upon the order of the function utilized to represent the relationship between voltage and thickness. Routines for performing "least squares" curve fit are well known in the art and described, for example, in the books "Mathematics of Physics and Modern Engineering" by Sokolnokoff and Redheffer (McGraw-Hill, 1966) and "A First Course in Numercial Analysis" by Ralston (McGraw-Hill, 1965).

In the present embodiment, the function relating $V_{pms}$ to $T_s$ is represented by two different equations, viz.:

$$V_{pms} = a_0 + a_1 T_s + a_2 T_s^2 + a_3 T_s^3$$

$$T_s = b_0 + b_1 V_{pms} + b_2 V_{pms}^2 + b_3 V_{pms}^3$$

Third order equations are set forth as examples. The coefficients $a_0, a_1, a_2$ and $a_3$ are stored in memory, as are the coefficients $b_0, b_1, b_2$ and $b_3$.

Figure 4:
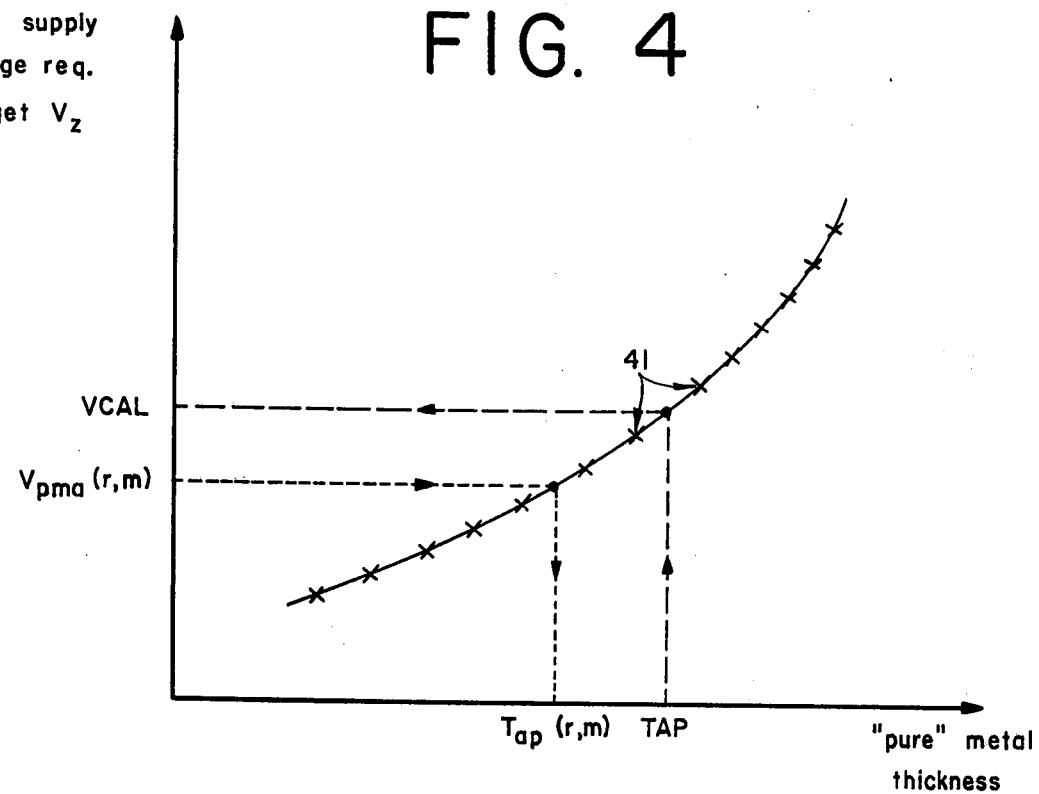
FIG. 4 is an illustrative graph of voltage measurements versus thickness, useful in understanding the invention.
Figure 6:
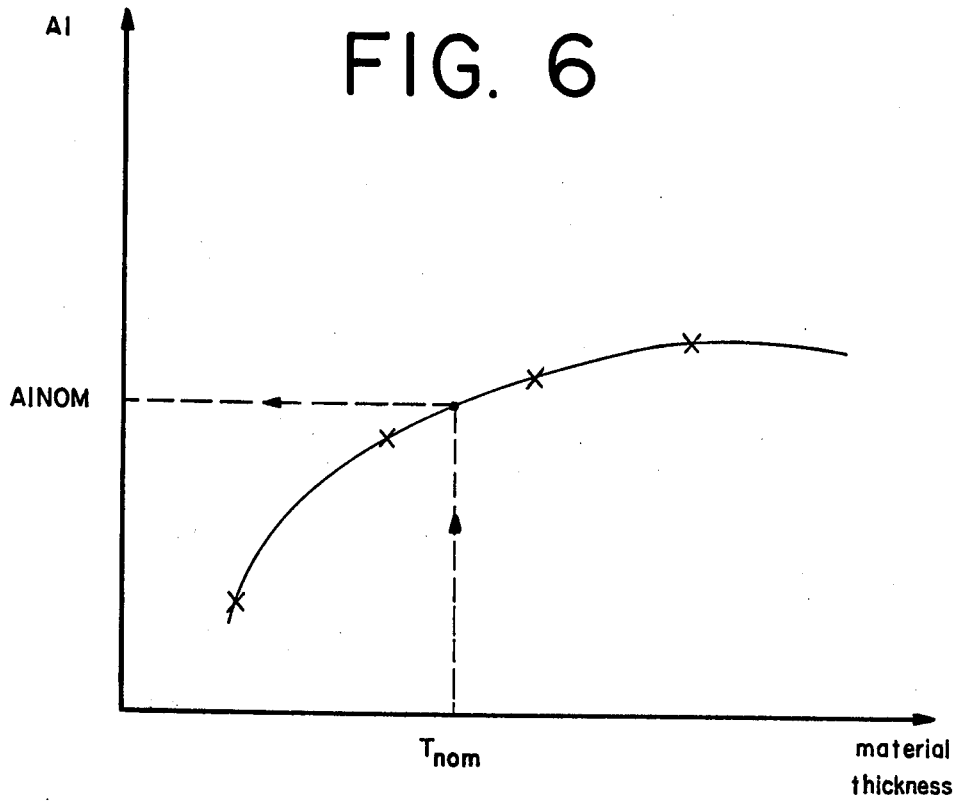
FIG. 6 is an illustrative graph of Absorption Index versus thickness, useful in understanding the invention.
Figure 5:
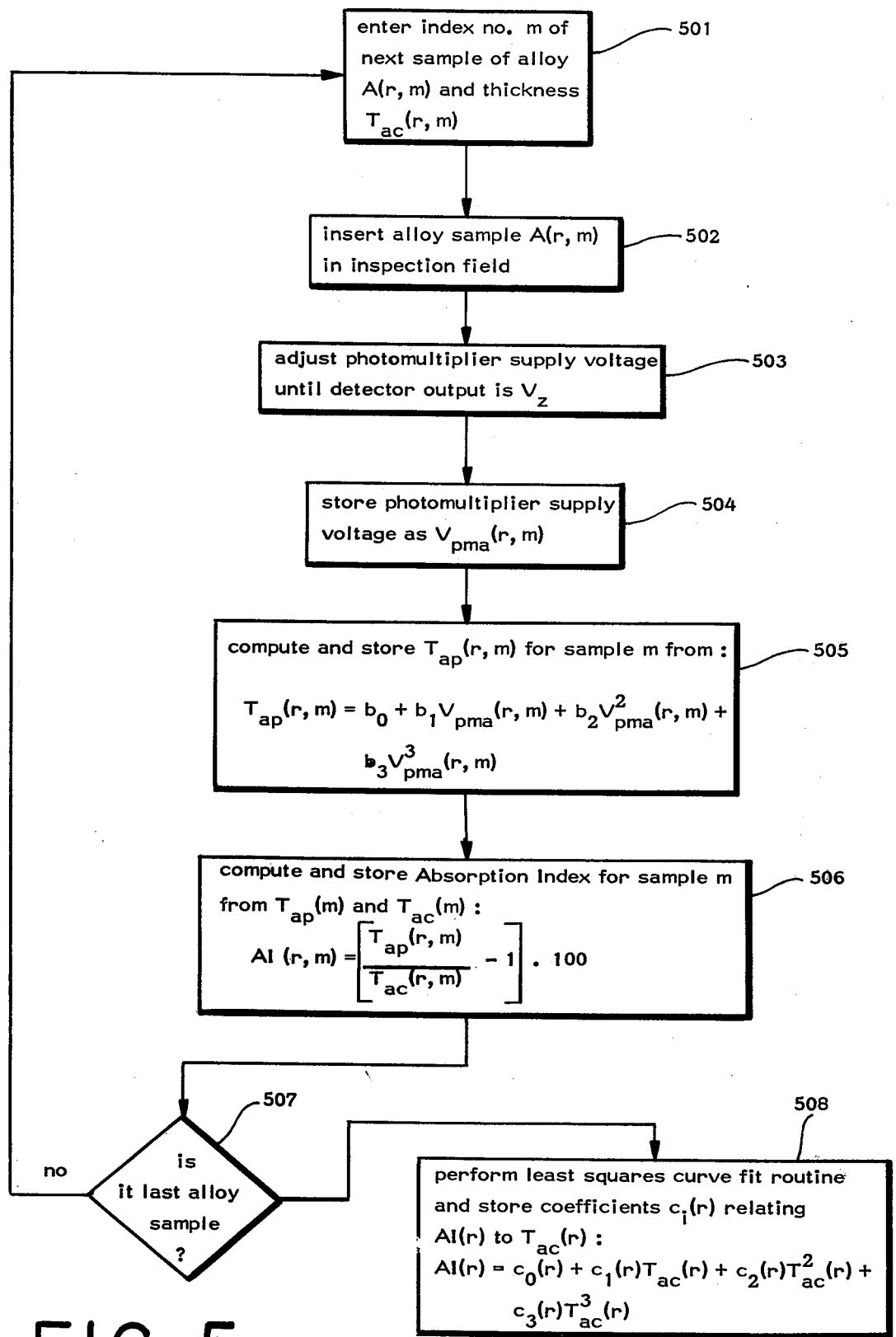
FIG. 5 is a flow diagram for implementing the functions represented by the block 204 of FIG. 2.

Referring to FIG. 5, there is shown a flow diagram suitable for implementing the routine represented by the block 204 of FIG. 2; i.e., performance of the absorption index determination for the alloy r. The index number m of the first alloy material sample to be temporarily positioned in the inspection field is initially entered by the operator, as represented by the block 501. The alloy sample is designated $A(r,m)$, indicating that it is sample number m of alloy r, and its known thickness, also entered by the operator, is designated as $T_{ac}(r,m)$, the subscript indicating that it is the actual previously known thickness. The alloy sample is temporarily positioned in the inspection field, as represented by the block 502. The photomultiplier supply voltage is then adjusted until the output amplifier voltage equals the reference voltage level, $V_z$ (block 503), and the photomultiplier supply voltage which yields this result is stored as $V_{pma}(r,m)$, as represented by the block 504. The apparent thickness of the sample m, designated as $T_{ap}(r,m)$ is then computed for the sample m from the relationship $$T_{ap}(r,m) = b_0 + b_1 V_{pma}(r,m) + b_2 V_{pma}^2(r,m) + b_3 V_{pma}^3(r,m)$$

where $b_0$ through $b_3$ are the previously stored coefficients relating the thickness of "pure" metal standard material to voltage measurements (see, for example, the dotted lines of FIG. 4). Accordingly, the computed value $T_{ap}(r,m)$ represents the thickness of the alloy sample m (for alloy r) in terms of the thickness of "pure" metal standard material; i.e. the "apparent thickness". Block 505 represents performance of this calculation. Since the actual thickness of the alloy material sample, $T_{ac}(r,m)$, is known, the absorption index for the sample m can be computed from the relationship $$AI(r,m) = \left[ \frac{T_{ap}(r,m)}{T_{ac}(r,m)} - 1 \right] \cdot 100$$

as represented by the block 506. Inquiry is then made (diamond 507) as to whether the material sample just measured is the last available material sample. If not, block 501 is reentered, the index number m of the next alloy material sample is entered, and it is measured and its associated absorption index is determined, as previously described. FIG. 6 illustrates, as small x's, the points AI $(r,m)$ plotted as a function of actual alloy material sample thickness, $T_{ac}(r,m,)$. A "least squares" curve fit is performed (as represented by block 508) through these points to obtain a general function relating AI to $T_{ac}$, for the particular alloy r, in accordance with the following function:

$$AI(r) = c_0(r) + c_1(r) T_{ac}(r) + c_2(r) T_{ac}^2(r) + c_3(r) T_{ac}^2(r)$$

Again, a third order equation is used for illustration. A Gauss-Seidel iterative technique may be employed to solve the linear simultaneous equations obtained by at least squares fit process. The coefficients $c_0(r)$, $c_1(r)$, $c_2(r)$ and $c_3(r)$ are representative of the function and are stored.

Referring to FIG. 7, there is shown a flow diagram suitable for implementing the gage calibration routine represented by block 205 of FIG. 2. During calibration, the photomultiplier supply voltage which is expected to yield a detector output amplifier voltage of $V_z$ is determined, and the photomultiplier supply voltage is initially set to this determined value, which is designatd VCAL. The nominal thickness of the alloy material ($r$) to be measured, desigated $T_{nom}$, is entered by the operator, as represented by the block 701. The absorption index of alloy material $r$, at the nominal thickness, $T_{nom}$, is next determined from the relationship $$AI(r) = c_0(r) + c_1(r)T_{nom} + c_2(r)T_{nom}^2 + c_3(r)T_{nom}^3$$

where the coefficients $c_0(r)$ through $c_3(r)$ are the previously determined AI function coefficients (see e.g. FIG. 5 and the curve of FIG. 6). This calculation is represented by the block 702 which also indicates that the computed AI is designated as "AINOM". An example of a value of AINOM which would be computed for a given nominal thickness is illustrated by the dashed line in FIG. 6. The apparent thickness of "pure" standard material that is equivalent to the nominal thickness of alloy material to be measured is designated $T_{ap}$, and is determined from the relationship $$AINOM = \left[\frac{T_{ap}}{T_{nom}} - 1\right] \cdot 100$$

where AINOM and $T_{nom}$ are now known. This determination is represented by the block 703. The computed apparent thickness is designated "TAP". The block 704 is next entered to calculate the photomultiplier supply voltage which would be expected to yield a detector output voltage of $V_z$ when measuring "pure" standard material of thickness TAP. This is done using the coefficients $a_0$ through $a_3$ in the following relationship:

$$V_{pmc} = a_0 + a_1 TAP + a_2 (TAP)^2 + a_3 (TAP)^3$$

The computed value of $V_{pmc}$ is called "VCAL". An example of the determination of VCAL for a particular apparent thickness, TAP, is illustrated by the dashed lines in FIG. 4. The photomultiplier supply voltage is accordingly set to an intial setting of VCAL, as represented by the block 705. An appropriate gain factor (recalling FIG. 3 and Equation (4) above) is next calculated by interpolating as between the gain factors $K(n)$ which were stored in conjunction with the two standard thickness values closest to TAP. In the example of FIG. 4, the points ($x$'s) indicated by the arrows 41 would be the ones used for the interpolation. (If desired, the interpolation could use three or more stored gain factors.) This function is represented by the block 706, and the computed gain factor is designated "GF".

Figure 8:
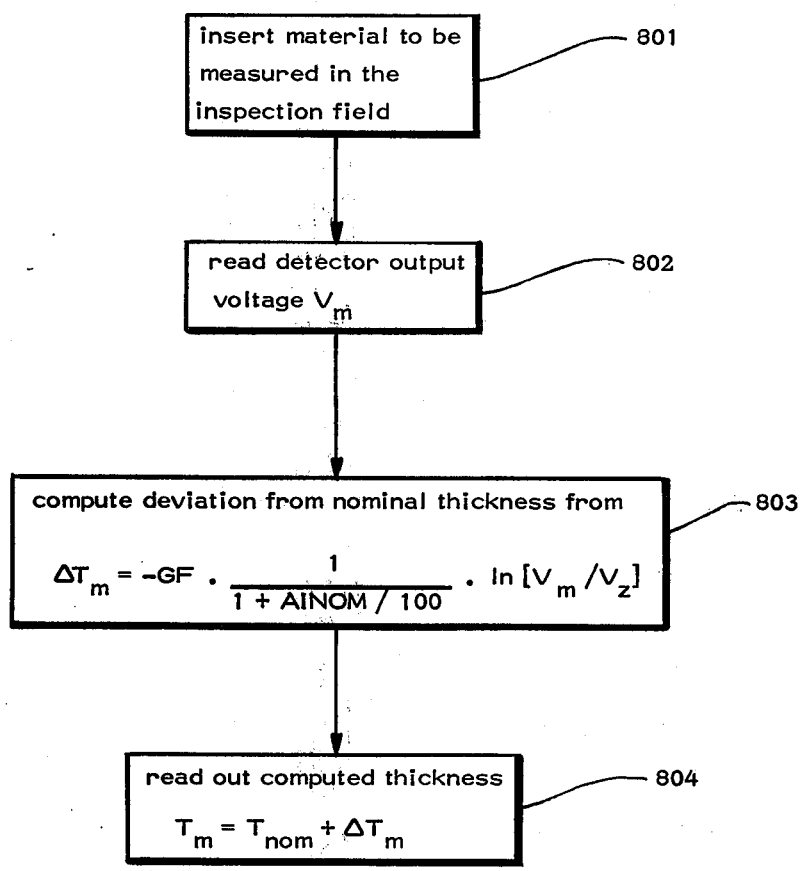
FIG. 8 is a flow diagram for implementing the functions represented by the block 206 of FIG. 2.

Referring to FIG. 8, there is shown a flow diagram which is suitable for implementing the material thickness measurement, as represented by the block 206 of FIG. 2. The alloy material to be measured is inserted in the inspection field, as represented by the block 801. Typically, the material to be measured will be a sheet material that is passed, on a continuous basis, through the inspection field, and measurements are continually made and read out and/or recorded. In the present embodiment, supply voltage is maintained at VCAL, and the detector output voltage, designated $V_m$, is sensed periodically, for example once per millisecond, as represented by the block 802. The measured thickness deviation, in terms of apparent thickness, can be expressed (using equation (4)) as:

$$\Delta T_{ap} = -GF \cdot \ln[V_m/V_z] \qquad (5)$$

Converting equation (5) into terms of the measured alloy (using AINOM), gives $$\Delta T_m = -GF \cdot \frac{1}{1 + AINOM/100} \cdot \ln[V_m/V_z]$$

The quantity $\Delta T_m$ is determined, as representd by the block 803, and can be read out directly, or $T_m$ can be computed and read out as the sum of $T_{nom}$ and $\Delta T_m$, as represented by the block 804.

The invention has been described with reference to a particular embodiment, but variations within the spirit and scope of the invention will occur to those skilled in the art. For example, it will be understood that the invention is not limited to any particular technique for obtaining the measurement values. As an example, the supply voltage to the photomultiplier could be maintained constant and the source energy could be adjusted until the detector amplifier output equals a particular reference voltage. Alternatively, an analog meter could be employed and read out directly after the source and/or detector sensitivity are calibrated. It will also be understood that over a relatively wide range of possible thicknesses, it may be advantageous to determine and store an AI function for each of a number of different discrete subranges for each material to be measured. In such case, when the nominal thickness of the material to be measured is entered, the appropriate AI curve is selected for use during the calibration and/or material measurement procedures. Finally, it is important to note that alternate functions can be generated from the first and second sets of measurements using techniques other than least squares curve fitting, this technique having been selected for purposes of illustration. For example, it may be advantageous, when computing VCAL from TAP (e.g. FIG. 7), to employ a Lagrange quadratic interpolation from the closest stored points (FIG. 4). This technique, which is also disclosed in the above-referenced books, may minimize error when a continuous curve cannot be accurately "fit" through all of the standardization points.

We claim:

1. In an apparatus for gaging the thickness of a material, said apparatus including a source of radiation, a detector spaced from the source of radiation, the space between the source and detector defining an inspection field which is adapted to receive the material, and means for generating measurement values as a function of the radiation attenuation caused by objects in the inspection field; an improvement for calibrating the source of radiation and/or the detector, comprising:

means for storing a first set of measurement values associated with standard pieces of known thickness temporarily positioned in the inspection field;

means responsive to said first set of measurement values for determining and storing a first function which represents the relationship between the thickness of the standard pieces and the measurement values determined therefrom;

means for storing a second set of measurement values associated with material samples of known thickness temporarily positioned in the inspection field;

means responsive to said second set of measurement values for determining and storing a second function;

means for storing an operator-entered nominal thickness for said material;

means for determining the expected measured value which would be obtained upon insertion of material of nominal thickness in the inspection field by computing said expected measured value from the operator-entered nominal thickness in conjunction with said first function and said second function; and means for adjusting said source and/or detector in accordance with the determined expected measured value.

2. Apparatus as defined by claim 1 wherein said second function represents the relationship between said relative attenuation attributable to said standard pieces and the relative attenuation attributable to said material samples for different thicknesses thereof.

3. Apparatus as defined by claim 1 wherein the means for determining the expected measured value includes means for determining an apparent thickness from said operator-entered nominal thickness and said second function; and means for determining the expected measured value from said apparent thickness and said first function.

4. Apparatus as defined by claim 2 wherein the means for determining the expected measured value includes means for determining an apparent thickness from said operator-entered nominal thickness and said second function; and means for determining the expected measured value from said apparent thickness and said first function.

5. For use in conjunction with an apparatus for gaging the thickness of a material, said apparatus including a source of radiation, a detector spaced from the source of radiation, the space between the source and detector defining an inspection field which is adapted to receive the material, and means for generating measurement values as a function of the radiation attenuation caused by objects in the inspection field; an improved method for calibrating the source and/or the detector, comprising the steps of:

(a) storing a first set of measurement values associated with standard pieces of known thickness temporarily positioned in the inspection field;

(b) determining and storing a first function which represents the relationship between the thickness of the standard pieces and the measurement values determined therefrom;

(c) storing a second set of measurement values associated with material samples of known thickness temporarily positioned in the inspection field;

(d) determining and storing a second function which represents the relationship between the relative attenuation attributable to the standard pieces and the relative attenuation attributable to the material samples for different thicknesses thereof;

(e) storing an operator-entered nominal thickness for said material;

(f) determining the expected measured value which would be obtained upon insertion of material of nominal thickness in the inspection field by computing the expected measured value from the operator-entered nominal thickness in conjunction with said first function and said second function; and (g) adjusting the source and/or detector in accordance with the determined expected measured value.

6. The method as defined by claim 5 wherein the step (f) of dretermining the expected measured value includes the steps of determining an apparent thickness from said operator-entered nominal thickness and said second function; and determining the expected measured value from said apparent thickness and said first function.

7. Apparatus for gaging the thickness of a material, comprising:

a source of radiation;

detector means spaced from said source of radiation, the space between said source and said detector defining an inspection field and being adapted to receive the material;

means for generating measurement values as a function of the radiation attenuation caused by objects in the inspection field;

means for storing a first set of measurement values associated with standard pieces of known thickness temporarily positioned in the inspection field;

means responsive to said first set of measurement values for determining and storing a first function which represents the relationship between the thickness of the standard pieces and the measurement values determined therefrom;

means for storing a second set of measurement values associated with material samples of known thickness temporarily positioned in the inspection field;

means responsive to said second set of measurement values for determining and storing a second function;

means for storing an operator-entered nominal thickness for said material;

means for determining the expected measured value which would be obtained upon insertion of material of nominal thickness in the inspection field by computing said expected measured value from the operator-entered nominal thickness in conjunction with said first function and said second function;

means for adjusting said source and/or detector means in accordance with the determined expected measured value, whereby material of approximately nominal thickness can subsequently be gaged.

8. Apparatus as defined by claim 7 wherein said second function represents the relationship between the relative attenuation attributable to said standard pieces and the relative attenuation attributable to said material samples for different thicknesses thereof.

9. Apparatus as defined by claim 8 wherein the means for determining the expected value includes means for determining an apparent thickness from said operator-entered nominal thickness and said second function; and means for determining the expected measured value from said apparent thickness and said first function.

10. Apparatus as defined by claim 9 wherein said first and second sets of measurement values are generated by adjusting source and/or detector supply level until a predetermined detector output is obtained and wherein subsequent measurements of material thickness are determined by deviations of the detector output after the source and/or detector supply has been adjusted in accordance with said expected measured value.

11. Apparatus as defined by claim 10 further comprising:
means for storing an additional set of measurement values associated with the standard pieces, said additional set of measurement values being generated by inserting the standard pieces in the inspection field in conjunction with an additional percentage thickness for each standard piece and measuring the resultant detector output;
means for determining an absorption coefficient from said first set of measurements and said additional set of measurements; and
means for determining measurements of material thickness from said deviations of the detector output and said absorption coefficient.

12. Apparatus as defined by claim 11 wherein said means for determining an absorption coefficient is also responsive to said apparent thickness determined from said operator-entered nominal thickness.

* * * * *